(12) United States Patent
Ono et al.

(10) Patent No.: US 6,634,791 B2
(45) Date of Patent: Oct. 21, 2003

(54) SHAFT BEARING MEMBER

(75) Inventors: Akira Ono, Nagoya (JP); Satoshi Imai, Nagoya (JP); Hiroichi Matsuhisa, Nagoya (JP); Seiji Mori, Saitama (JP)

(73) Assignee: Daido Metal Company Ltd., Nagoya (JP)

( * ) Notice: Subject to any disclaimer, the term of this patent is extended or adjusted under 35 U.S.C. 154(b) by 14 days.

(21) Appl. No.: 09/988,366

(22) Filed: Nov. 19, 2001

(65) Prior Publication Data
US 2002/0061146 A1 May 23, 2002

(30) Foreign Application Priority Data

Nov. 20, 2000 (JP) ......................................... 2000-352807

(51) Int. Cl.$^7$ .............................................. F16C 33/10
(52) U.S. Cl. ....................................... 384/291; 384/288
(58) Field of Search ................................... 384/114, 118, 384/120, 286, 287, 288, 289, 291, 292

(56) References Cited

U.S. PATENT DOCUMENTS

| 5,009,522 | A | * | 4/1991 | Hahn ........................... 384/288 |
| 6,065,878 | A | * | 5/2000 | Ono et al. .................... 384/288 |
| 6,176,621 | B1 | * | 1/2001 | Naitoh et al. ................ 384/291 |
| 6,491,438 | B1 | * | 12/2002 | Ono et al. .................... 384/288 |

* cited by examiner

Primary Examiner—Thomas R. Hannon
(74) Attorney, Agent, or Firm—Browdy and Neimark, P.L.L.C.

(57) ABSTRACT

A shaft bearing member includes an inner circumferential face serving as a sliding surface, an oil groove formed in the inner circumferential face so as to circumferentially extend, and a recess formed in the inner circumferential face so as to extend from at least one of both widthwise sides of the oil groove toward axial end side of the inner circumferential face with respect to the shaft so that the recess is rendered shallower and shallower.

17 Claims, 9 Drawing Sheets

SHAFT BEARING MEMBER

BACKGROUND OF THE INVENTION

1. Field of the Invention

This invention relates to a shaft bearing member having an oil groove formed in an inner circumferential face or sliding surface so as to circumferentially extend.

2. Description of the Related Art

Multiple cylinder engines for automobiles comprise a balance shaft provided in parallel with a crankshaft so as to be linked with the crankshaft in rotation so that vibration caused in the engine is reduced, for example. A plain bearing is usually used as a shaft bearing for supporting the balance shaft. Even if the balance shaft can reduce the vibration produced by the overall engine, the engine suffers a frictional loss due to the balance shaft with addition of a bearing for the balance shaft. Accordingly, provision of the bearing for the balance shaft becomes a disadvantageous condition. As a result, a reduction in the frictional loss in the bearing for the balance shaft has been desired.

SUMMARY OF THE INVENTION

Therefore, an object of the present invention is to provide a shaft bearing member which can reduce the frictional loss due to rotation of the shaft.

The present invention provides a shaft bearing member for supporting a shaft so that the shaft is rotatable, the shaft bearing member having an inner circumferential face serving as a sliding surface. The shaft bearing member comprises an oil groove formed in the inner circumferential face so as to circumferentially extend, and a recess formed in the inner circumferential face so as to extend from at least one of both widthwise sides of the oil groove toward an axial end of the inner circumferential face with respect to the shaft so that the recess is rendered shallower and shallower.

The lubrication oil supplied to the oil groove of the shaft bearing member flows through the oil groove onto the sliding surface with rotation of the shaft. An oil film pressure produced between the shaft and the sliding surface separates the shaft from the sliding surface. The inner circumferential face serving as the sliding surface has the recess formed in the inner circumferential face so as to extend from at least one of both widthwise sides of the oil groove toward an axial end of the inner circumferential face with respect to the shaft so that the recess is rendered shallower and shallower. Accordingly, the lubrication oil in the oil groove more easily tends to flow through the recess toward the axial end side of the sliding surface, thereby facilitating formation of an oil film. Consequently, the frictional loss resulting from rotation of the shaft can be reduced since a direct contact between the shaft and the sliding surface is avoided.

To achieve the same object, the invention also provides a shaft bearing member for supporting a shaft so that the shaft is rotatable, the shaft bearing member having an inner circumferential face serving as a sliding surface. The shaft bearing member comprises an oil groove formed in the inner circumferential face so as to circumferentially extend, and two recesses formed in the inner circumferential face so as to extend from both widthwise sides of the oil groove toward both axial ends of the inner circumferential face with respect to the shaft respectively so that the recesses are rendered shallower and shallower. Since the recesses are formed in both widthwise sides of the oil groove, formation of the oil film is further facilitated, whereupon the frictional loss resulting from rotation of the shaft can further be reduced.

In a first preferred form, the inner circumferential face includes two flat faces formed near the axial ends thereof respectively so as to be parallel with an axis of the shaft. Consequently, the shaft can be supported well since the oil film is desirably formed on the flat faces.

In a second preferred form, each flat face has an axially outer end formed with an escape portion which retreats radially outward so as to become lower than the flat face. When the shaft swings with an axial inclination, there is a possibility that the shaft may locally contact both axial ends of the shaft bearing member. In view of this local contact, when the escape portion is formed near the axially outer end of the inner circumferential face, an occurrence of the local contact between the shaft and sliding surface can be prevented.

In a third preferred form, the inner circumferential face includes a crowned portion near the axial end thereof. In this construction, too, the shaft can be supported well by the crowned portion and an occurrence of the local contact between the shaft and sliding surface can be prevented.

In a fourth preferred form, the shaft bearing member is formed into a generally semicylindrical shape, and the recesses are formed in a circumferentially central portion of the inner circumferential face thereof and excluded in portions thereof near circumferential ends of the inner circumferential face respectively, said portions being formed with flat faces parallel with the axis of the shaft respectively. In a case where two semicylindrical shaft bearing members are combined together into a cylindrical bearing shaft member, the lubrication oil disadvantageously tends to flow out of the circumferential ends when the recesses extend to the circumferential ends of the inner circumferential face respectively. However, since no recesses are formed in the portions located near both circumferential ends, the lubrication oil can be prevented from flowing out of the circumferential ends.

In a fifth preferred form, the inner circumferential face includes a plurality of narrow grooves formed therein so as to extend obliquely relative to a rotation direction of the shaft from the oil groove through the recesses toward the axial end sides respectively. The narrow grooves guide a lubrication oil from the oil groove toward the axial end sides with rotation of the shaft. The narrow grooves are shallower and narrower than the oil groove. The lubrication oil supplied to the oil groove more easily tends to flow through the narrow grooves into a gap between the shaft and the sliding surface with rotation of the shaft, whereby formation of an oil film is facilitated.

BRIEF DESCRIPTION OF THE DRAWINGS

Other objects, features and advantageous of the present invention will become clear upon reviewing of the following description of embodiments, made with reference to the accompanying drawings, in which.

DETAILED DESCRIPTION OF EMBODIMENTS

Figure 2A:
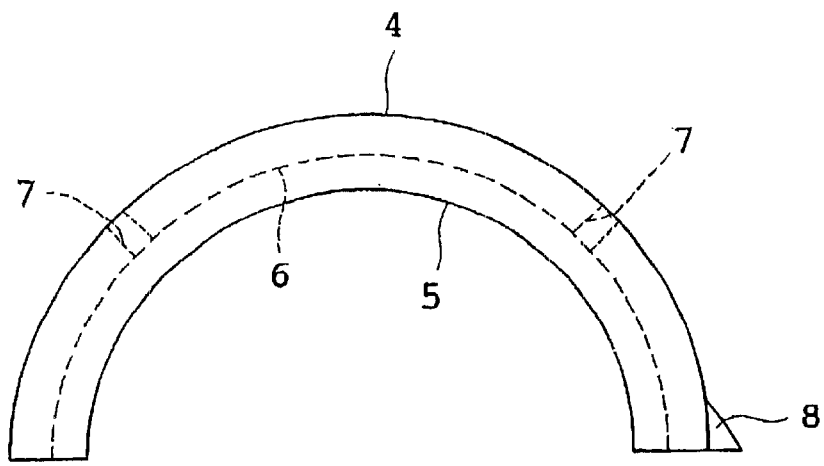
FIGS. 2A and 2B are a front view of the semicylindrical bearing and a plan view of the inner circumferential side respectively.
Figure 2B:
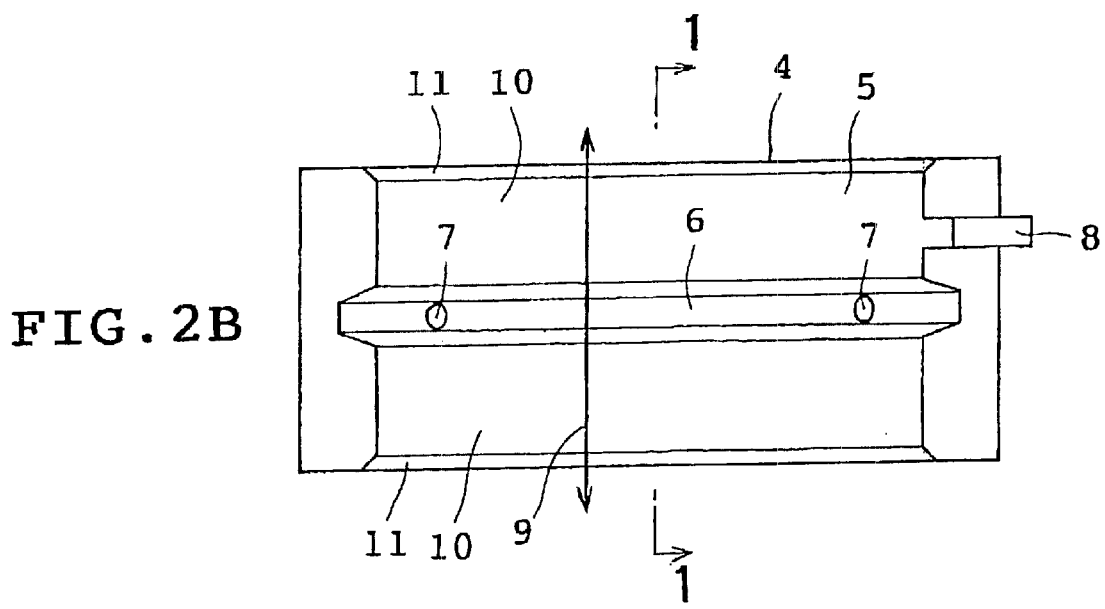
Figure 3:
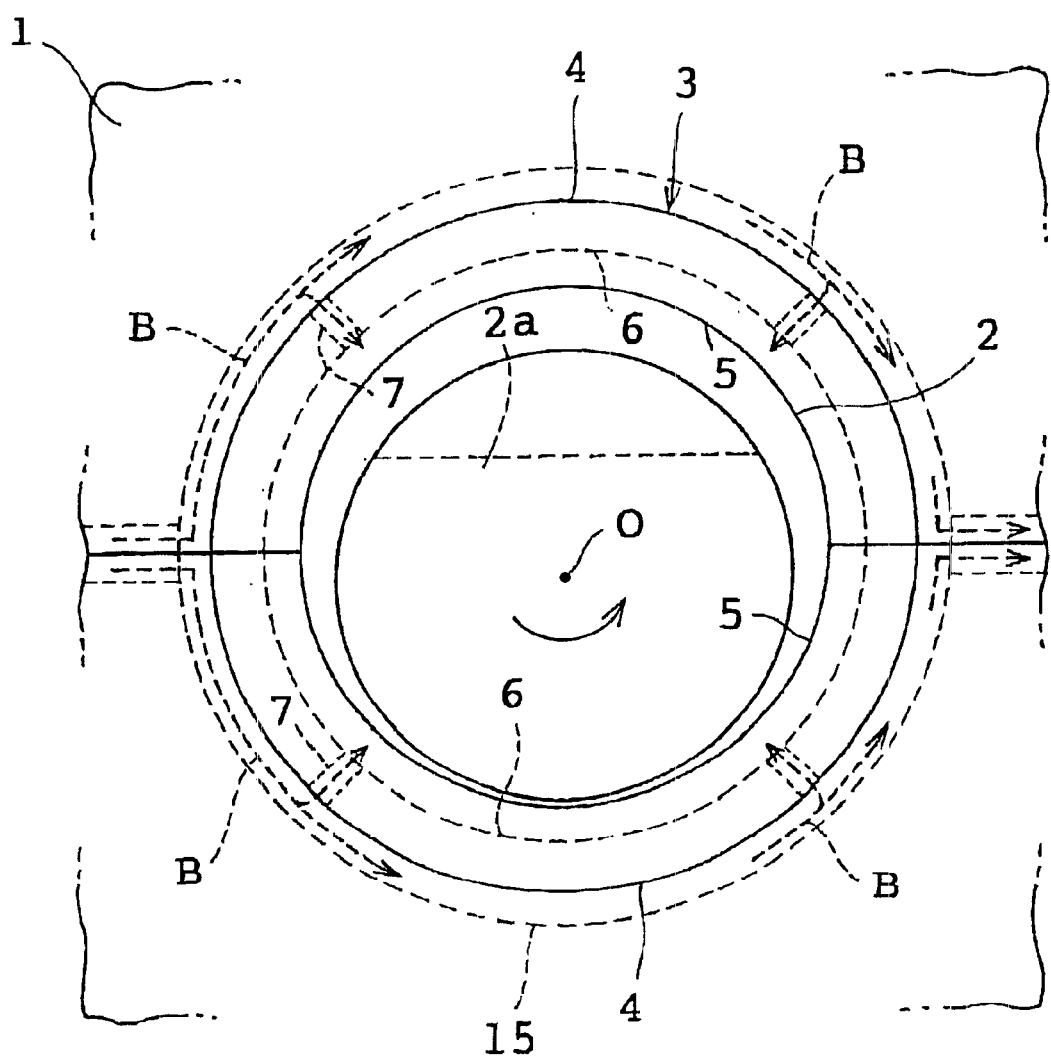
FIG. 3 is a front view of the bearing supporting a balance shaft.

A first embodiment of the invention will be described with reference to FIGS. 1 to 3. In the first embodiment, the invention is applied to a balancer bearing for supporting a balance shaft of an automobile engine. Referring first to FIG. 3, a housing 1 for the automobile engine is shown. A plain bearing 3 is provided on the housing 1 and constitutes a shaft bearing member for supporting a balance shaft 2 serving as a shaft. The housing 1 is divided into upper and lower parts. The balance shaft 2 includes an unbalanced portion 2a having a substantially semicircular section and formed into a semicylindrical shape. The balance shaft 2 is rotated about a rotation center O.

The plain bearing 3 includes two bearing halves 4 butted against each other into a cylindrical shape. Each bearing half 4 has a generally semicylindrical section and includes an oil groove 6 formed in an inner circumferential face 5 serving as a sliding surface so as to circumferentially extend, two lubrication holes 7 each open at a bottom of the oil groove 6 in a circumferential wall, and a lug 8 formed on a circumferential end, as shown in FIGS. 2A and 2B.

Figure 1:
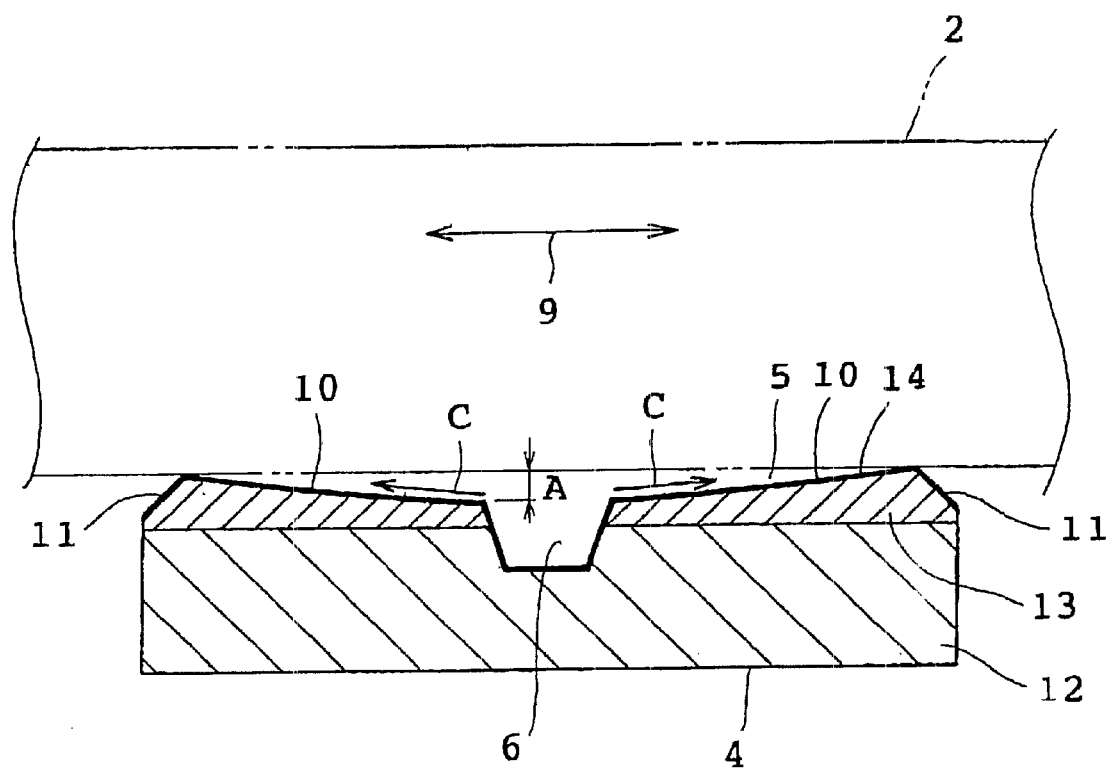
FIG. 1 is a sectional view of a semicylindrical bearing of a first embodiment in accordance with the invention, the view being taken along line 1—1 in FIG. 2B.

Two recesses 10 are formed in the inner circumferential face 5 of each bearing half 4 so as to extend from both widthwise sides of the oil groove. 6 toward axial end sides of the inner circumferential face 5 with respect to the balance shaft 2 so that the recesses 10 are rendered shallower and shallower, as shown in FIG. 1. Two chamfers 11 are formed on both axial ends respectively. Each recess 10 has a maximum depth A ranging from 1 to 30 μm. The maximum depth A of each recess 10 is about 20 μm in the embodiment. Each bearing half 4 has a three-layer structure including a back metal 12, a bearing alloy 13 and an overlay 14. The surfaces of the oil groove 6, recesses 10 and each chamfer 11 are covered with the overlay 14. The overlay 14 may be made from any one of systems of lead (Pb), tin (Sn) and resin.

The housing 1 provided with the foregoing plain bearing 3 has an oil passage 15 through which the lubrication oil is supplied, as shown in FIG. 3. The lubrication oil is supplied through the oil passage 15 and lubrication holes 7 into the oil groove 6 as shown by arrows B in FIG. 3.

The lubrication oil supplied to the oil groove 6 of the plain bearing 3 flows onto the sliding surface with rotation of the balance shaft 2. An oil film pressure produced between the balance shaft 2 and the sliding surface separates the shaft from the sliding surface. The inner circumferential face 5 serving as the sliding surface has the two recesses 10 formed therein so as to extend from both widthwise sides of the oil groove 6 toward the axial end sides of the inner circumferential face 5 so that the recesses 10 are rendered shallower and shallower. Accordingly, the lubrication oil in the oil groove 6 more easily tends to flow through the narrow grooves 10 toward both end sides of the inner circumferential face 5 in the direction of the axis 9 as shown by arrows C in FIG. 1, thereby facilitating formation of an oil film. Consequently, the frictional loss resulting from rotation of the balance shaft 2 and accordingly fuel consumption of the engine can be reduced since a direct contact between metals, namely, between the balance shaft 2 and the sliding surface of the plain bearing 3 is prevented in a range of practical rotational speed of the balance shaft 2.

A load the balance shaft 2 applies to the plain bearing 3 is a rotational inertia force due to an unbalance load of the balance shaft 2. Accordingly, the load is small when a rotational speed of the balance shaft 2 is low. Consequently, the load is small during the time of low rotational speed when an oil film is produced less frequently, and even when the inner circumferential face 5 of the plain bearing 3 has no flat surface parallel to the axis 9 (balance shaft 2) or only a small flat surface, this does not directly result in the loss of bearing function such as abnormal friction or seizure.

The inner circumferential face 5 of each bearing half 4 is covered with the overlay 14. The inner circumferential face 5 has unavoidable slight roughness due to machining. However, since the face 5 is covered with the overlay 14 in the embodiment, the face 5 is apt to be conformed to the balance shaft 2, whereupon the frictional loss can further be reduced. Additionally, two bearing halves 4 are butted against each other into the circular cylindrical plain bearing 3. Consequently, the recesses 10 and the like can easily be formed in the inner circumferential face 5 of each bearing half 4.

Figure 4:
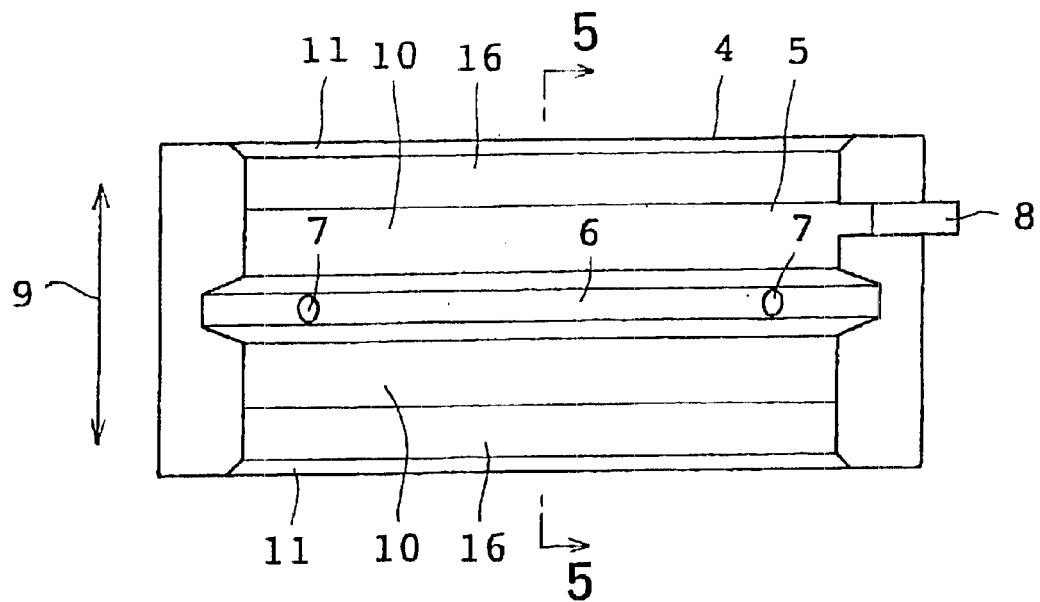
FIG. 4 is a view similar to FIG. 2B, showing the semicylindrical bearing of a second embodiment in accordance with the invention.
Figure 5:
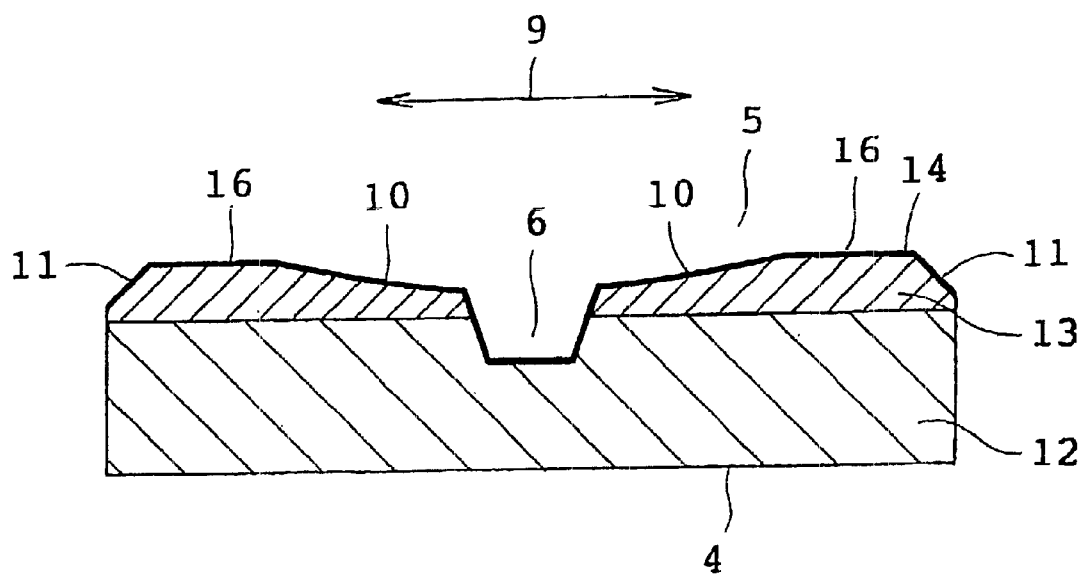
FIG. 5 is a view similar to FIG. 1 and taken along line 5—5 in FIG. 4.

FIGS. 4 and 5 illustrate a second embodiment of the invention. The inner circumferential face 5 of each bearing half 4 has two flat faces 16 formed near the end sides of the inner circumferential face 5 in the direction of the axis 9 respectively. The oil film is satisfactorily formed between the flat faces 16 and the balance shaft 2 in the above-described construction. Consequently, the balance shaft 2 can be supported sufficiently.

Figure 6:
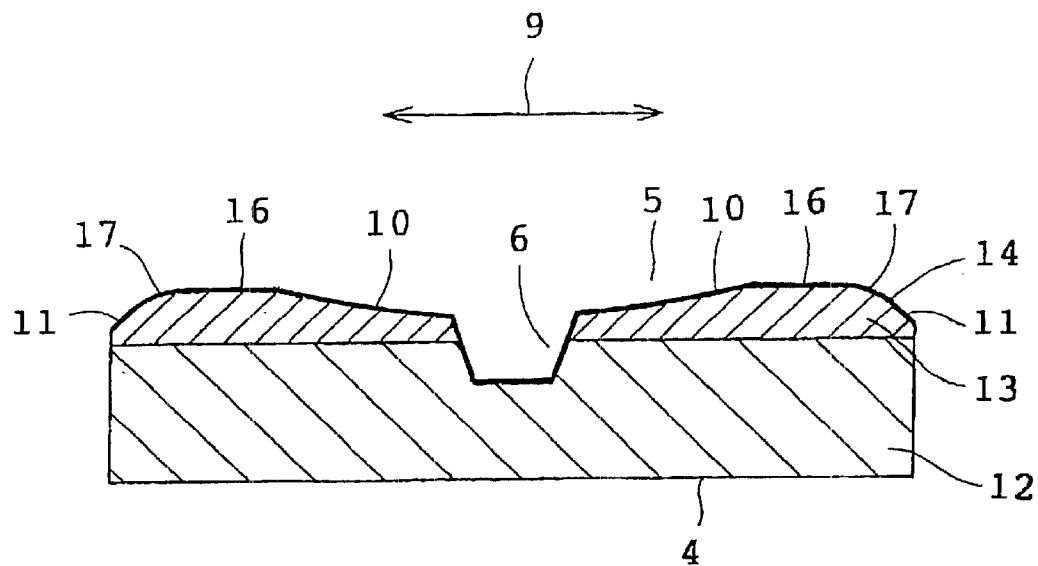
FIG. 6 is a view similar to FIG. 1, showing the semicylindrical bearing of a third embodiment in accordance with the invention.

FIG. 6 illustrates a third embodiment of the invention. The third embodiment differs from the second embodiment in that two escape portions 17 are formed near the axially outer end of the inner circumferential face so as to retreat radially outward from the flat faces 16. Each escape portion 17 has a maximum depth of about 20 μm and is formed using a crowning processing with a curved surface.

An oil film pressure by squeeze effect refers to an oil film produced between a shaft and a sliding surface by a sudden radial movement of the shaft. An oil film pressure by wedge effect refers to an oil film produced when rotation of a shaft supported by the bearing draws a lubrication oil between the shaft and the sliding surface. The oil film by squeeze effect is not expected when a rotational inertia force of the balance shaft 2 acts as a load. Accordingly, the oil film by wedge effect needs to be ensured. For this purpose, a ratio of the width to the radius of the plain bearing 3 or each bearing half 4 is in most cases large. In this case, when the balance shaft 2 swings with an inclination in the direction of axis 9 during acceleration or deceleration of the engine, there is a possibility that the balance shaft 2 may locally contact both ends of the plain bearing 3 in the direction of axis 9.

In the embodiment, however, the escape portion 17 is formed in the outer end of each flat face 16 in the direction of axis 9, whereupon an occurrence of the local contact between the balance shaft 2 and sliding surface can be prevented. Consequently, the frictional loss can further be reduced.

Figure 7:
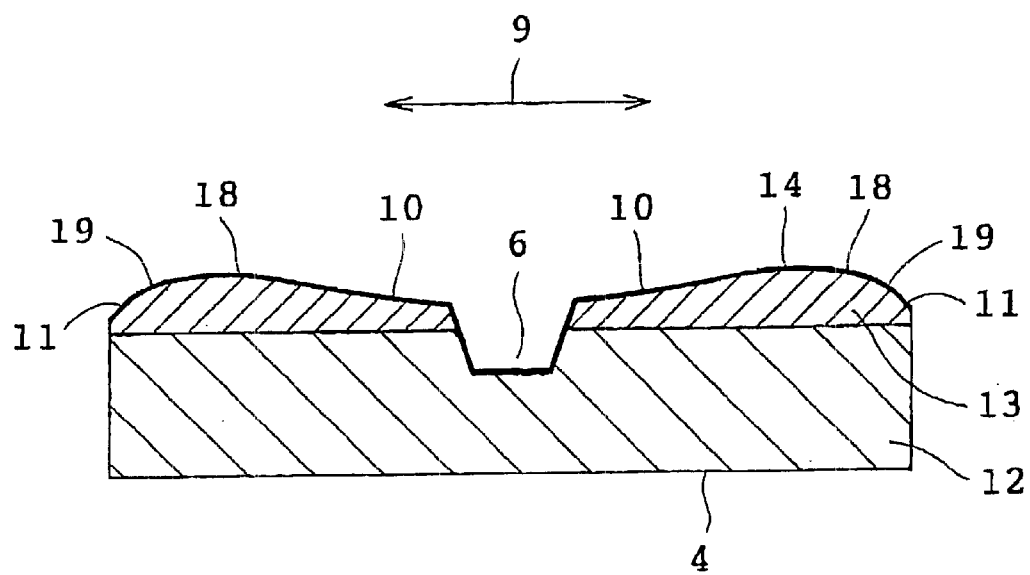
FIG. 7 is a view similar to FIG. 1, showing the semicylindrical bearing of a fourth embodiment in accordance with the invention.

FIG. 7 illustrates a fourth embodiment of the invention. The fourth embodiment differs from the third embodiment in that the inner circumferential face 5 of each bearing half 4 has no flat faces formed in the axially outer ends of the inner circumferential face 5 respectively. Two curved crowned portions 18 are formed in the axially outer ends of the inner circumferential face 5 respectively, instead. In this case, too, the axially outer ends of the crowned portions 18 constitute escape portions 19 so as to retreat radially outward from the apexes of the crowned portions 18. The same effect can be achieved from the fourth embodiment as from the third embodiment.

Figure 8:
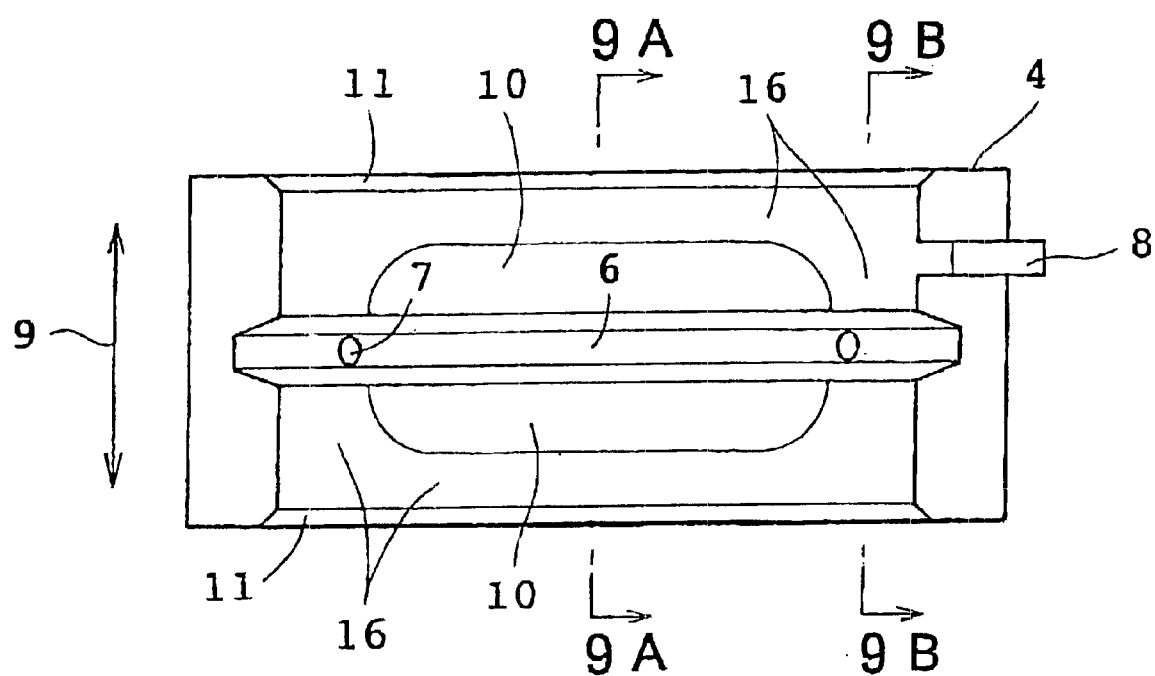
FIG. 8 is a view similar to FIG. 2B, showing the semicylindrical bearing of a fifth embodiment in accordance with the invention.
Figure 9:
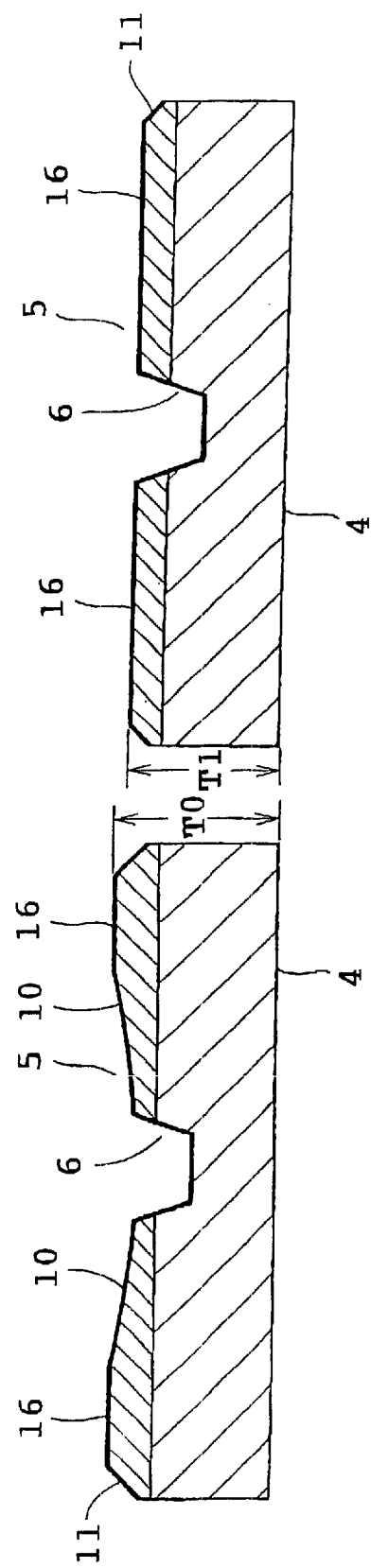
FIGS. 9A and 9B are a view similar to FIG. 1 and taken along line 9A—9A in FIG. 8 and a view similar to FIG. 1 and taken along line 9B—9B in FIG. 8 respectively.

FIGS. 8, 9A and 9B illustrate a fifth embodiment of the invention. The fifth embodiment differs from the second embodiment in that the recesses 10 are formed in the circumferentially central portion of the inner circumferential face 5 of each bearing half 4. However, the portions of the inner circumferential face 5 near both circumferential ends are formed with no recesses but the flat faces 16 parallel to the axis 9. Each circumferential end of each bearing half 4 is formed with a crash relief which is not shown in detail. Each circumferential end of the crash relief has a thickness T1 slightly smaller than the maximum thickness T0 of the circumferentially central portion (T1<T0).

When the two bearing halves 4 are combined together into a cylindrical plain bearing 3, the lubrication oil disadvantageously tends to flow through the recesses 10 out of the circumferential ends of the plain bearing 3. In the embodiment, however, since the portions located near both circumferential ends have no recesses 10 and serve as the flat faces 16 parallel with the axis 9, the lubrication oil can be prevented from flowing out of the circumferential ends.

Figure 10:
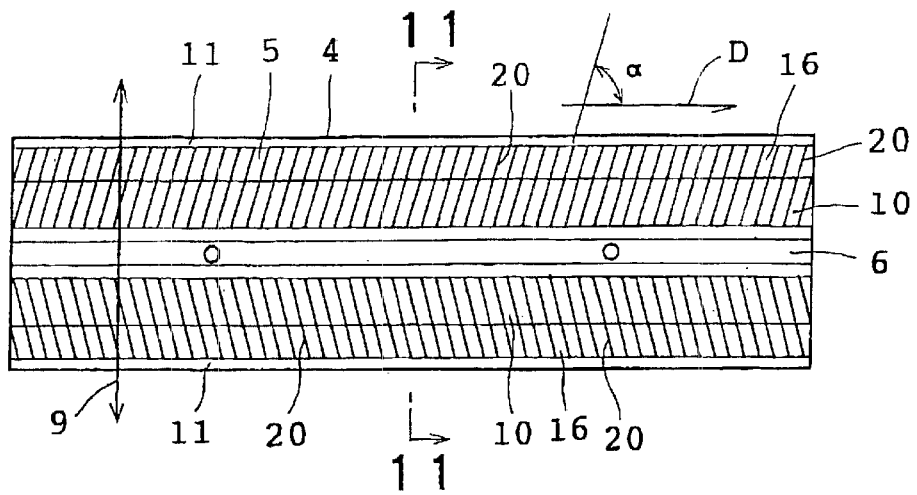
FIG. 10 is a developed view of the inner circumferential side of the semicylindrical bearing of a sixth embodiment in accordance with the invention.
Figure 11:
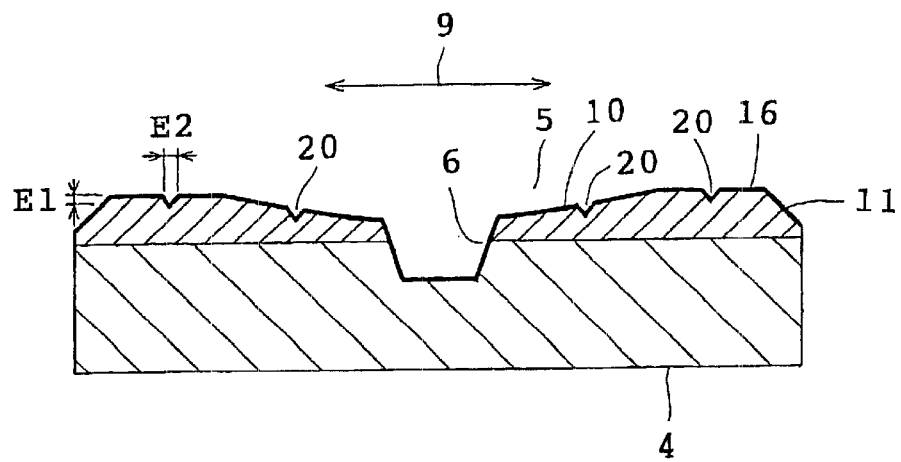
FIG. 11 is a view similar to FIG. 1 and taken along line 11—11 in FIG. 10.
Figure 12:
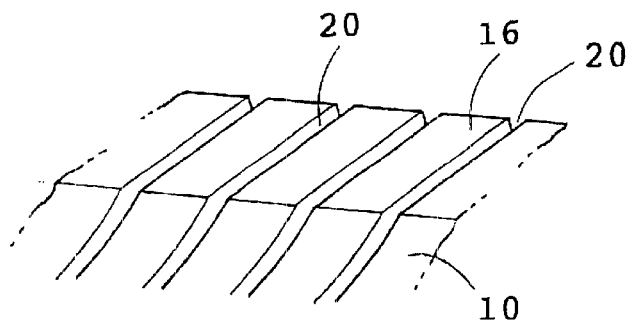
FIG. 12 is an enlarged perspective view of the bearing.

FIGS. 10 to 12 illustrate a sixth embodiment of the invention. The sixth embodiment differs from the second embodiment in that a plurality of narrow grooves 20 are formed in the inner circumferential face 5 of each bearing half 4 so as to extend obliquely at a predetermined angle relative to a rotation direction of the shaft from both widthwise sides of the oil groove 6 through the recesses 10 and flat faces 16 toward both axial ends of the inner circumferential face 5. The narrow grooves 20 are shallower and narrower than the oil groove 6. Each narrow groove 20 is linear and inclined at an angle of a relative to the rotation direction D of the shaft, for example, about 75 degrees in the embodiment. Further, each narrow groove 20 preferably has a depth E1 ranging between 3 and 50 μm and a width E2 ranging between 5 and 100 μm.

In the above-described construction, the lubrication oil supplied to the oil groove 6 more easily tends to flow through the narrow grooves 20 into a gap between the balance shaft 2 and the sliding surface with rotation of the shaft, whereby formation of an oil film can further be enhanced and accordingly, the frictional loss can further be reduced. The narrow grooves 20 may be curved.

Figure 13:
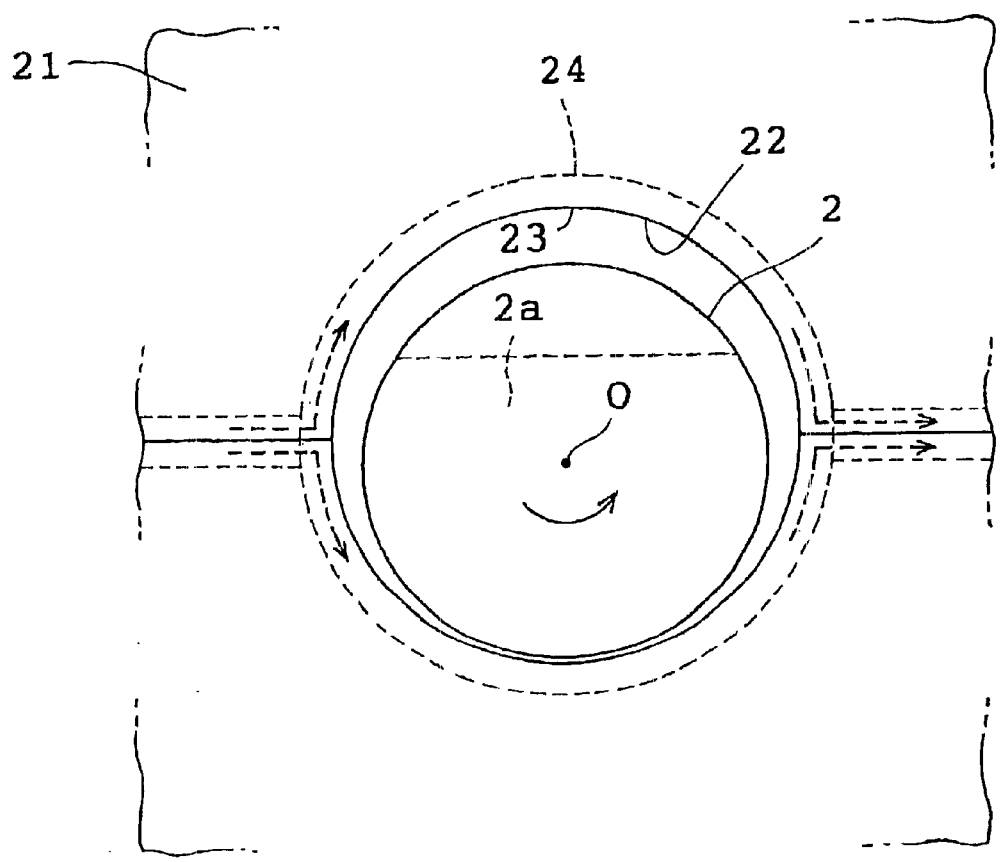
FIG. 13 is a view similar to FIG. 3, showing the semicylindrical bearing of a seventh embodiment in accordance with the invention.

FIG. 13 illustrates a seventh embodiment of the invention. The seventh embodiment differs from the foregoing embodiments in that no discrete plain bearing is provided on a housing 21 of the engine. The balance shaft 2 is directly supported in a circular hole 22 formed in the two-piece housing 21. Thus, the housing 21 constitutes the shaft supporting member supporting the balance shaft 2. The inner circumferential face 23 of the hole 22 serving as the sliding surface is formed with the circumferentially extending oil groove 24 and the recesses 10 etc. which are substantially the same as those in the first embodiment.

The recess 10 may be formed in at least one of both widthwise sides of the oil groove 6.

The plain bearing 3 and the housing 21 may be applied to cases where shafts other than the balance shaft 2 are received.

The sliding shaft 3 may singly constitute a cylindrical member. Each bearing half 4 may have a double-layer structure including the bearing alloy and overlay or a single-layer structure of the bearing alloy other than the three-layer structure.

The narrow grooves 20 in the sixth embodiment may be formed in the inner circumferential faces 5 of each bearing half 4 in the first, third, fourth and fifth embodiments and in the inner circumferential face 23 of the housing 21 in the seventh embodiment.

The foregoing description and drawings are merely illustrative of the principles of the present invention and are not to be construed in a limiting sense. Various changes and modifications will become apparent to those of ordinary skill in the art. All such changes and modifications are seen to fall within the scope of the invention as defined by the appended claims.

We claim:

1. A shaft bearing member for supporting a shaft so that the shaft is rotatable, the shaft bearing member having an inner circumferential face serving as a sliding surface, the shaft bearing member comprising:
    an oil groove formed in the inner circumferential face so as to circumferentially extend; and
    a recess formed in the inner circumferential face so as to extend from at least one of both widthwise sides of the oil groove toward an axial end of the inner circumferential face with respect to the shaft so that the recess is rendered shallower and shallower;
    wherein the inner circumferential face includes a crowned portion near the axial end thereof.

2. A shaft bearing member according to claim 1, which is formed into a generally semicylindrical shape, wherein the recesses are formed in a circumferentially central portion of the inner circumferential face thereof and excluded in portions thereof near circumferential ends of the inner circumferential face respectively, and the flat faces are formed in said portions.

3. A shaft bearing member according to claim 2, wherein the inner circumferential face includes a plurality of narrow grooves formed therein so as to extend obliquely relative to a rotation direction of the shaft from the oil groove through the recess toward the axial end side, the narrow grooves guiding a lubrication oil from the oil groove toward the axial end side with rotation of the shaft, the narrow grooves being shallower and narrower than the oil groove.

4. A shaft bearing member according to claim 1, wherein the inner circumferential face includes a plurality of narrow grooves formed therein so as to extend obliquely relative to a rotation direction of the shaft from the oil groove through the recess toward the axial end side, the narrow grooves guiding a lubrication oil from the oil groove toward the axial end side with rotation of the shaft, the narrow grooves being shallower and narrower than the oil groove.

5. A shaft bearing member for supporting a shaft so that the shaft is rotatable, the shaft bearing member having an inner circumferential face serving as a sliding surface, the shaft bearing member comprising:
- an oil groove formed in the inner circumferential face so as to circumferentially extend; and
- two recesses formed in the inner circumferential face so as to extend from both widthwise sides of the oil groove toward both axial ends of the inner circumferential face with respect to the shaft respectively so that the recesses are rendered shallower and shallower,
- wherein the inner circumferential face includes two crowned portions near the axial ends thereof respectively.

6. A shaft bearing member according to claim 5, which is formed into a generally semicylindrical shape, wherein the recesses are formed in a circumferentially central portion of the inner circumferential face thereof and excluded in portions thereof near circumferential ends of the inner circumferential face respectively, said portions being formed with flat faces parallel with the axis of the shaft respectively.

7. A shaft bearing member according to claim 6, wherein the inner circumferential face includes a plurality of narrow grooves formed therein so as to extend obliquely relative to a rotation direction of the shaft from the oil groove through the recesses toward the axial end sides respectively, the narrow grooves guiding a lubrication oil from the oil groove toward the axial end sides with rotation of the shaft, the narrow grooves being shallower and narrower than the oil groove.

8. A shaft bearing member according to claim 5, wherein the inner circumferential face includes a plurality of narrow grooves formed therein so as to extend obliquely relative to a rotation direction of the shaft from the oil groove through the recesses toward the axial end sides respectively, the narrow grooves guiding a lubrication oil from the oil groove toward the axial end sides with rotation of the shaft, the narrow grooves being shallower and narrower than the oil groove.

9. A shaft bearing member for supporting a shaft so that the shaft is rotatable, the shaft bearing member having an inner circumferential face serving as a sliding surface, the shaft bearing member comprising:
- an oil groove formed in the inner circumferential face so as to circumferentially extend; and
- two recesses formed in the inner circumferential face so as to extend from both widthwise sides of the oil groove toward both axial ends of the inner circumferential face with respect to the shaft respectively so that the recesses are rendered shallower and shallower;
- wherein the inner circumferential face includes two flat faces formed near the axial ends thereof respectively so as to be parallel with an axis of the shaft, and
- wherein each flat face has an axial outer end formed with an escape portion which retreats radially outwardly so as to become lower than the flat face.

10. A shaft bearing member according to claim 9, which is formed into a generally semicylindrical shape, wherein the recesses are formed in a circumferentially central portion of the inner circumferential face thereof and excluded in portions thereof near circumferential ends of the inner circumferential face respectively, said portions being formed with flat faces parallel with the axis of the shaft respectively.

11. A shaft bearing member according to claim 10, wherein the inner circumferential face includes a plurality of narrow grooves formed therein so as to extend obliquely relative to a rotation direction of the shaft from the oil groove through the recesses toward the axial end sides respectively, the narrow grooves guiding a lubrication oil from the oil groove toward the axial end sides with rotation of the shaft, the narrow grooves being shallower and narrower than the oil groove.

12. A shaft bearing member according to claim 9, wherein the inner circumferential face includes a plurality of narrow grooves formed therein so as to extend obliquely relative to a rotation direction of the shaft from the oil groove through the recesses toward the axial end sides respectively, the narrow grooves guiding a lubrication oil from the oil groove toward the axial end sides with rotation of the shaft, the narrow grooves being shallower and narrower than the oil groove.

13. A shaft bearing member for supporting a shaft so that the shaft is rotatable, the shaft bearing member having an inner circumferential face serving as a sliding surface, the shaft bearing member comprising:
- an oil groove formed in the inner circumferential face so as to circumferentially extend; and
- a recess formed in the inner circumferential face so as to extend from at least one of both widthwise sides of the oil groove toward an axial end of the inner circumferential face with respect to the shaft so that the recess is rendered shallower and shallower,
- wherein the inner circumferential face includes a plurality of narrow grooves formed therein so as to extend obliquely relative to a rotation direction of the shaft from the oil groove through the recess toward the axial end side, the narrow grooves guiding a lubrication oil from the oil groove toward the axial end side with rotation of the shaft, the narrow grooves being shallower and narrower than the oil groove.

14. A shaft bearing member for supporting a shaft so that the shaft is rotatable, the shaft bearing member having an inner circumferential face serving as a sliding surface, the shaft bearing member comprising:
- an oil groove formed in the inner circumferential face so as to circumferentially extend; and
- two recesses formed in the inner circumferential face so as to extend from both widthwise sides of the oil groove toward both axial ends of the inner circumferential face with respect to the shaft respectively so that the recesses are rendered shallower and shallower;
- wherein the inner circumferential face includes a plurality of narrow grooves formed therein so as to extend obliquely relative to a rotation direction of the shaft from the oil groove through the recesses toward the axial end sides respectively, the narrow grooves guiding a lubrication oil from the oil groove toward the axial end sides with rotation of the shaft, the narrow grooves being shallower and narrower than the oil groove.

15. A shaft bearing member according to claim 14, wherein the inner circumferential face includes a plurality of narrow grooves formed therein so as to extend obliquely relative to a rotation direction of the shaft from the oil groove through the recesses toward the axial end sides respectively, the narrow grooves guiding a lubrication oil from the oil groove toward the axial end sides with rotation of the shaft, the narrow grooves being shallower and narrower than the oil groove.

16. A shaft bearing member for supporting a shaft so that the shaft is rotatable, the shaft bearing member having an inner circumferential face serving as a sliding surface, the shaft bearing member comprising:

an oil groove formed in the inner circumferential face so as to circumferentially extend; and two recesses formed in the inner circumferential face so as to extend from both widthwise sides of the oil groove toward both axial ends of the inner circumferential face with respect to the shaft respectively so that the recesses are rendered shallower and shallower;

wherein the inner circumferential face includes two flat faces formed near the axial ends thereof respectively so as to be parallel with an axis of the shaft, and wherein the inner circumferential face includes a plurality of narrow grooves formed therein so as to extend obliquely relative to a rotation direction of the shaft from the oil groove through the recesses toward the axial end sides respectively, the narrow grooves guiding a lubrication oil from the oil groove toward the axial end sides with rotation of the shaft, the narrow grooves being shallower and narrower than the oil groove.

17. A shaft bearing member according to claim 16, wherein the inner circumferential face includes a plurality of narrow grooves formed therein so as to extend obliquely relative to a rotation direction of the shaft from the oil groove through the recesses toward the axial end sides respectively, the narrow grooves guiding a lubrication oil from the oil groove toward the axial end sides with rotation of the shaft, the narrow grooves being shallower and narrower than the oil groove.

* * * * *

UNITED STATES PATENT AND TRADEMARK OFFICE
CERTIFICATE OF CORRECTION

PATENT NO. : 6,634,791 B2
DATED : October 21, 2003
INVENTOR(S) : Akiro Ono, Hiroichi Matsuhisa and Seiji Mori It is certified that error appears in the above-identified patent and that said Letters Patent is hereby corrected as shown below:

<u>Title page,</u>
Item [73], Assignee, after "(JP)" insert -- Honda Giken Kogyo Kabushiki Kaisha, Tokyo (JP) --

Signed and Sealed this

Ninth Day of November, 2004

JON W. DUDAS
*Director of the United States Patent and Trademark Office*